Sept 10, 1957      L. DEWAN      2,805,846
DEVICE FOR CARBONATING BEVERAGES
Filed Nov. 8, 1954
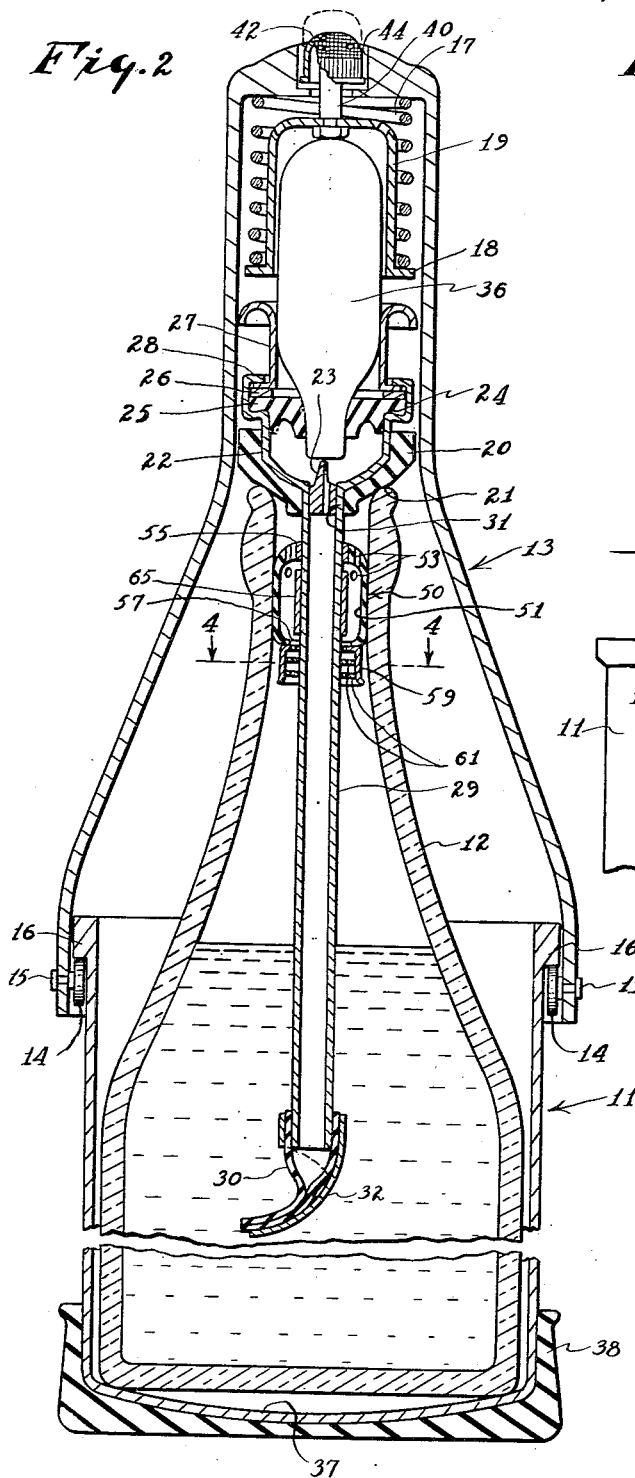
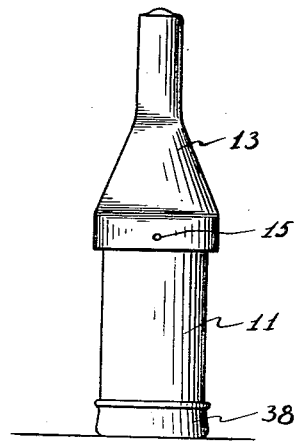
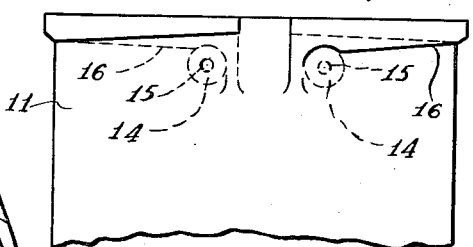
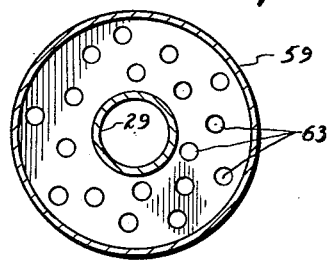
INVENTOR.
Leon Dewan
BY Emery, Varney, Whittemore & Dix
ATTORNEYS

United States Patent Office 2,805,846
Patented Sept. 10, 1957

2,805,846

DEVICE FOR CARBONATING BEVERAGES

Leon Dewan, New York, N. Y.

Application November 8, 1954, Serial No. 467,345

13 Claims. (Cl. 261—121)

This invention relates to a portable carbonic beverage charger in which a small cartridge containing compressed $CO_2$ is discharged into and enclosed beverage container and the mixture is thoroughly shaken to cause absorption of the $CO_2$ and formation of carbonic acid gas by the liquid under pressure.

In the prevailing form of this type of charger, a strong container capable of withstanding the full pressure produced by the $CO_2$ cartridge is provided with a siphon, and after the discharge of $CO_2$ and absorption of the liquid, the valve of the siphon is opened and the beverage is allowed to be propelled out of the bottle by the residual gas pressure.

However, since carbonic acid gas is only retained in the beverage under a tranquil condition known in the art as a "rest charge" and is released from the liquid by agitation, a great deal of the "charge" passes into the air when the beverage is thus forcibly ejected and the actual product in the glass for drinking is relatively flat.

Furthermore, a bottle strong enough to resist the full pressure of the $CO_2$ cartridge discharge plus a siphon mechanism makes the prevailing charger relatively expensive.

One object of the invention is to provide an improved beverage charger from which the liquid is poured, in contrast to the siphoning action used in chargers of the prior art, and one in which a considerably higher carbonic charge can be obtained than with known beverage chargers of the prior art.

Another object is to provide a beverage charger which does not have to withstand the full pressure of the $CO_2$, and which can consequently be manufactured at lower cost. The preferred embodiment of this invention uses the common large soda beverage bottle, wine bottle, or other similar commercial container in which the liquid is contained when in the beverage charger of this invention. One feature of the invention relates to a construction which permits such commercial bottles to be used in spite of the tolerances in their height variations.

Another object of the invention is to provide a beverage charger in which bottles of liquid can be charged successively and each bottle removed for subsequent use while still containing the charged beverage. Many home beverage chargers have required that the liquid be left in the charger until it is used, and this made it impossible to charge more than one bottle of beverage at a time.

Other features of the invention relate to adjustability of the charge imparted to any liquid; a high charge being given to a beverage such as club soda, and a lower charge being given to fruit juices, acid drinks, and other beverages where a lower charge is more desirable. Still other features relate to a construction which makes the charger of this invention safer to use and which insures against leakage of the liquid as a foam through the gas safety outlet of the charger.

Another object is to provide a beverage charger with a visible signal for indicating to the user that the gas cartridge has been pierced and that it is time to start shaking the charger, if a strong charge is desired.

In the prevailing form of chargers, the container is filled with the beverage only to a certain height, leaving a space in the container to permit shaking of the contents and subsequent absorption of $CO_2$. Usually the beverage amounts to approximately a quart and the empty space about 12 oz.

The normal pressure produced in the container then depends upon the empty space left in the bottle, into which the contents of the $CO_2$ cartridge is discharged. One type is provided with a blow-out valve for above normal pressure. Others have been proposed with spring safety valve, also designed to operate when pressure exceeds the normal.

According to this invention, a pair of separable shells are made to receive a standard soda bottle, wine bottle, or other container, and to stopper it; and the bottle is filled with the beverage up to a point where enough space is left for shaking. This minimum space is approximately one-sixth of the total volume of this bottle. Thus, the normal pressure produced in this space if the bottle were sealed would be approximately 350 p. s. i. Since the ultimate bursting strength of this type of bottle is also 350 p. s. i. this condition would be dangerous. However, the bottle is resiliently stoppered by spring means which allow escape of the gas at considerably below the normal pressure of 350 p. s. i. in contradistinction to the prevailing charger. For example the valve relieves at something like 100 to 150 p. s. i., which would allow a safety factor of about 3. This valve is not ordinarily allowed to operate, however, since if it does the maximum charge such as required for a club soda, for example, would be reduced.

The means for charging the beverage and at the same time preventing the valve from operating are as follows:

(1) The apparatus is so arranged that the $CO_2$ cartridge can be pierced in one quick motion;

(2) The cartridge does not instantly discharge its contacts, but requires a significant time to do so;

(3) The user pierces the cartridge and immediately begins to shake the charger. This creates absorption of carbon dioxide almost as fast as the gas is discharged from the cartridge and thus the pressure does not rise to the escape point of 100 p. s. i. during the discharge period, and thus practically all of the gas is absorbed and creates a highly charged soda of about 4 to 6 volumes charge, depending upon the temperature of the liquid.

On the other hand, where the user wishes to charge fruit juices where only about 2–3 volumes is needed, he does not shake the charger upon cartridge piercing, but waits until the 100# pressure is attained; and this pressure raises the valve and allows some of the gas to escape. When he hears the gas escaping, the user thereupon shakes the charger to absorb the remaining gas and obtain the desired lower charge.

However in the event that the charger is not shaken the gas will escape well below the bursting pressure of the bottle and no possible harm can result to the bottle charger, or user. Only a weakened charge results.

Other objects, features and advantages of the invention will appear or be pointed out as the description proceeds.

In the drawing, forming a part hereof, in which like reference characters indicate corresponding parts in all the views;

Figure 1 is a side elevation of a beverage charger embodying this invention;

Figure 2 is a greatly enlarged, vertical sectional view through the beverage charger shown in Figure 1;

Figure 3 is a diagrammatic, detail view of the means for connecting the top and bottom section of the charger; and Figure 4 is a greatly enlarged view on the line 4—4 of Figure 2.

A lower shell 11 receives a standard soda bottle 12, and an upper shell 13 is detachably secured to the lower shell by means of rollers 14 journalled on studs 15 which are secured at their outer ends to the upper shell 13. The rollers 14 ride on cam or ramp ledges 16 which are integral with the upper part of the lower shell 11.

The construction of the ledges 16 and the way in which the rollers 14 connect the upper shell to the lower shell will be best understood by reference to Figure 3. There are two cam or ramp ledges 16, each of which extends for somewhat less than 180 degrees around the periphery of the shell 11. There is a gap between the end of one of the ledges 11 and the beginning of the next as clearly shown in Figure 3. These gaps at diametrically opposite locations on the lower shell 11 are somewhat wider than the diameter of the rollers 14 so that the rollers can be passed downwardly through these gaps when the upper shell is originally placed on the lower shell 11.

Each of the ledges 16 has a cam surface as its bottom face, and these cam surfaces force the rollers 14 downwardly as the rollers rotate around the lower shell 11 in response to turning of the upper shell by which the rollers 14 are carried.

Referring to Figure 2, the upper portion of the shell 13 encloses a spring 17 which is compressed between the top of the upper shell and a flange 18 at the lower end of a cup 19 enclosed within the spring 17.

In the bottle 12 there is an insert consisting of a rubber stopper 20 having a sloping face 21 which seats against the top lip of the bottle 12 to serve as a valve for preventing escape of gas from the bottle 12. The slope of the bottom face of the stopper 20, which contacts with the lip of the bottle 12, becomes progressively steeper. Thus at each location on the sloping bottom surface of the stopper 20, outward and upward from the lower end of the stopper, the diverging of diametrically opposite areas of the sloping surface, or of tangents to the surface, is less. This compensates the tendency of larger mouthed bottles to raise the stopper 20 at lower gas pressure. A metal cup 22 is pressed into a socket in the upper end of the stopper 20 and is held in the stopper by friction. This cup 22 contains a cartridge piercing needle 23 swedged into an outlet passage in the bottom of the cup 22. The cup 22 has a shoulder 24 near its upper end. A rubber gasket 25, washer 26 and the bottom flange of a barrel 27 are clamped together between this shoulder 24 and an inwardly spun flange 28 at the upper end of the cup 22.

A tube 29, preferably made of metal or plastic, extends down from the outlet passage at the bottom of the cup 22 and has a flattened rubber tube or vent tongue 30 at its lower end. The tube 29 is preferably connected to the cup 22 and fits with a press fit in a central opening 31 through the stopper 20.

A deflector 32 has a tubular upper end which clamps around the tube 29 over the upper end of the rubber tube 30. This deflector 32 extends downwardly and curves under the flattened end of the rubber tube 30 so that the tube is deflected and somewhat more pressure is required to make the flattened sides of the tube 30 separate from one another. This construction makes the gas bubbles from the tube 30 more pronounced and it increases the sound caused by the escape of gas bubbles from the tube 30. This makes it easier for a person using the charger to tell whether gas is still being discharged into the liquid from the gas supply tube 29.

A $CO_2$ cartridge 36 fits into the rubber gasket 24, and the cartridge 36 is held in an upright position by the barrel 27, as shown in Figure 2. When in this position, the cartridge 36 has its discharge end located immediately over the piercing needle 23 so that a small amount of downward movement of the cartridge will cause the discharge end of the cartridge to be pierced by the needle 23.

In the construction illustrated, the inside bottom surface 37 of the lower shell 11 is concave about a center at the top of the cartridge so that bottles of smaller diameter than the bottle 12 will tend to center themselves in the shell; and in any event will be in line with the cartridge. The illustrated construction also has a rubber cushion 38 attached to the lower end of the shell 11, so that the shell can be gripped more firmly, and as a support on which the shell rests when placed on a table.

A bolt 40 is rigidly connected to the upper end of the cup 19. This bolt 40 extends through an opening in the top of the shell 11, and there is a signal button 42 connected to the upper end of the bolt. The signal button 42 fits into a recess 44 in the top face of the upper shell 13. When the signal button 42 is in its normal position, down in the recess 44, only the top of the button 42 is visible. This top is preferably the same color as the adjacent surface of the upper shell 13. The sides of the button 42 are painted a different color, for example red, in order that they will attract attention when the button 42 rises part way out of the recess 44.

When a new cartridge 36 is placed in the barrel 27, and the upper shell 13 is placed over the cartridge, with the cartridge extending upwardly into the cup 19, this cup 19 and the bolt 40 with the signal button 42 at its upper end are thrust upwardly as the upper shell 13 moves downwardly.

When the upper shell 13 has been moved part way around the cam surfaces 16, and the needle 23 has not yet pierced the cartridge 36, the cartridge holds the cup 19 raised and the spring 17 compressed so that the button 42 extends from the recess 44 as indicated in broken lines in Figure 2. As soon as the pressure on the cartridge 23 becomes great enough to cause the needle to pierce the cartridge, then the spring 17 forces the cartridge 36 downwardly on the needle and the signal button 42 moves back into the recess 44. This gives a signal, to the user of the charger, indicating that the cartridge has been pierced and that it is time to begin shaking the charger.

There is a trap 50 for preventing the discharge of foam from the bottle. With drinks containing sugar, foam is likely to be formed in the bottle and this foam often travels up the sides of the bottle by a capillary action. It is desirable to prevent this foam from being discharged from the bottle with gas which escapes during and after a charging operation. This strap 50 includes a hollow and resilient stopper 51 which fits down into the neck of the bottle 12. The stopper 51 is substantially spherical when not distorted, but it is resilient enough to be easily distorted to fit into bottles having necks with considerable differences in diameter.

There are openings 53 in the upper part of the stopper 51. A metal bushing 55 is secured to the stopper 51 and slides freely on the tube 29. At the bottom of the stopper 51 there is an annular opening 57 around the tube 29. This annular opening is covered by an inverted cup 59 which is secured to the stopper 51 and which has holes through the portion of the cup that covers the opening 57. The inverted cup 59 has a central opening through which the tube 29 extends, and the cup 59 is freely slidable on the tube 29 as a unit with the stopper 51. When the stopper 51 is made of rubber, the bushing 55 and the inverted cup 59 are preferably vulcanized to the stopper 51.

There are baffles 61 extending across the full width of the cup 59, between the sides of the cup, and these baffles have openings 63 extending through them. The openings 63 are similar to the openings in the portion of the cup 59 which extends across the opening 57 in the bottom of the stopper 51.

There is a fixed collar 65 secured to the tube 29 and located within the hollow interior of the stopper 51. This collar 65 is somewhat shorter than the distance between the bushing 55 and the top surface of the cup 59.

When the tube 29 is pushed downwardly into the neck of a bottle, the collar 65 contacts with the top surface of the cup 59 and pulls stopper 51 into the bottle. Because of the fact that the stopper 51 is pulled into the bottle from the lower end of the stopper, the stopper elongates and decreases in diameter without jamming in the bottle. When the stopper 51 is to be removed from the bottle, the tube 29 is pulled upwardly; and the collar 65 comes into contact with the bushing 55 of the stopper to pull the stopper from the bottle by force exerted against the upper end of the stopper. Thus the collar 65 exerts a pull on the stopper 51 whether the stopper is being inserted into or removed from the neck of the bottle.

The sides of the inverted cup 59 are spaced inwardly from the inside surface of the bottle 12. Foam that travels upwardly along the side of the bottle 12 by capillary action reaches the stopper 51, and after sufficient accumulation may coat the outside surface of the inverted cup 59. However, the lower edge of the inverted cup 59 is an abrupt turn about which the foam cannot travel and the liquid in the foam that accumulates on the outside surface of the cup 59 eventually becomes heavy enough to drip from the bottom edge of the cup 59 back into the liquid in the lower portion of the bottle 12.

When the charger is to be used, the bottle 12 is filled with water, or other liquid which is to be charged, with a minimum space left in the upper portion of the bottle to permit shaking and mixing. This space should be about one sixth to one seventh of the volume of the bottle. The stopper 20 and the assembly of parts which are connected to it, are then placed in the bottle. The cartridge 36 is then pressed down into the rubber gasket 25, into the position shown in Figure 2, and the upper shell 13 is then brought down on the assembly so that the upper end of the cartridge 36 fits into the cup 19 and the rollers 14 move down into position to cooperate with the cam ledges 16.

The upper shell 11 is then turned, and this causes the rollers 14 to move the shell downwardly. This downward movement of the upper shell 11 first causes the cup 19 and the signal 42 to be displaced upwardly with respect to the shell 13 until the pressure on the cartridge 36 becomes sufficient to cause the needle 23 to pierce the cartridge as previously explained. This downward pressure on the cartridge 36 also exerts a downward pressure on the cup 22, and this pressure on the cup holds the stopper 20 in firm contact with the lip of the bottle 12.

The upper shell 13 is preferably turned with one quick motion which carries the rollers 14 to the end of the ledges 16 at which there is a depression into which the rollers 14 move to lock the shells 13 and 11 together. The continued pressure of the spring 17 keeps the rollers 14 in the depressions at the end of the cam ledges 16, best shown in Figure 3, so that the upper and lower shells will remain in assembled relation unless sufficient turning force is exerted to move the rollers 14 out of the depressions at the ends of the cam ledges 16.

When the cartridge 36 is pierced, the gas in the cartridge passes downwardly through the tubes 29 and 30 and into the liquid in the bottle 12. It is a feature of the construction that the tube 29 is long enough to reach down into the liquid in the bottle.

When the user wants a high charge, as for a drink such as club soda, he commences to shake the charger immediately after the cartridge 36 has been pierced, and the gas is absorbed by the liquid at a rate which prevents the pressure in the bottle from rising to the value at which gas can escape from the bottle by lifting the stopper 20 against the pressure of the spring 17. If the user wants a lower charge, such as is desirable for fruit juices and certain other drinks, he refrains from shaking the charger until the gas pressure in the bottle has risen to such a high value that the gas lifts the stopper 20 and escapes between the stopper and the lip of the bottle. Some gas is thus permitted to escape before shaking the charger. In either case, the shaking of the charger is continued as long as gas can be heard bubbling from the tube 30 into the liquid in the bottle.

The upper shell 13 is then turned back slowly and lifted from the cartridge 36 so that the pressure of the spring 17 against the stopper assembly is withdrawn and the stopper releases excess pressure from the bottle. If the charged liquid contains sugar or other thickening flavored matter, the charged liquid will often froth and mount by capillary action up along the inside wall of the bottle so that it would foam out of the bottle with the excess gas. In the present invention, this is prevented by having the stopper 51 fit within the mouth of the bottle as a piston, and by having any excess gas pressure escape through the openings in the stopper 51.

The operation of the rubber gasket 25 in sealing off the nose of the gas cartridge 36 is different from that in prevailing types of chargers which wedge the cartridge nose into a gasket, usually by a screw or lever, and then extricate the cartridge forcibly using the same screw or lever. With the present invention, the cartridge 36 can be inserted and removed manually with perfect ease. The sealing is effected by the pressure that is built up in the bottle as the gas escapes therein, this pressure acting on the inner surfaces of the gasket 25 to cause a self-sealing action. The washer 26 prevents the gasket 25, which is of soft live rubber, from being forced out too far in the space between the barrel 27 and the sloping face on the front of the cartridge 36.

The standard commercial large soda beverage bottles are manufactured with an extreme variation in height of about ⅛ of an inch (plus or minus one-sixteenth inch). If a short stiff spring were used in place of the spring 17 of this invention to create the valve action, then the difference in force of compression caused by a variation in bottle height between the maximum and minimum heights would be considerable. For satisfactory operation, conditions must be such that when a minimum height bottle is used it will cause at least enough force by compression of the spring 17 to pierce the cartridge 36, plus a certain additional pressure as a margin of safety to insure reliable operation of the charger. With a bottle of maximum height in the same apparatus, it is essential that the spring pressure does not build up so rapidly that the valve, comprising the stopper 20, will retain such a high gas pressure in the bottle as to reach a danger point, especially when the user desires a low charge and does not begin to shake the charger until he hears some gas escaping from the bottle.

A long spring that would lessen the differences between the forces caused by maximum and minimum height bottles would require a cam ledge having a very steep gradient to produce sufficient travel to compress such a spring, and this would make the upper shell too difficult to turn, or it would require a greater amount of turning with a screw thread in place of the cams, and this would be time consuming and inconsistent with the mode of operation of the charger. With this invention, the spring 17 is originally long, but it is compressed to about one half of its length and restrained in the compressed condition by the flange 18 of the cup 19. This construction has been found to give very satisfactory operation. For example, a spring having a full length of two inches can be compressed to one inch, between the flange 18 and top of the shell, and made to exert a force of forty pounds on the cup. The pressure required to pierce the cartridge is about fifty pounds.

When a bottle of minimum height is used, the rollers 14 engage the cam ramps 16 end at a low point and cause a travel and consequent deflection of the spring 17 equal to about one eighth of an inch. This produces a force of sixty pounds by the time the rollers have reached their locked position and this pressure is ample for piercing the cartridge. When the charger is used with a bottle of maximum height, the rollers 14 engage the cam ramp at the highest part of the ramp, and the rotation of the upper shell 13 to bring the rollers to their locked position produces an additional deflection of one eighth inch but this does not raise the pressure of the spring to much more than eighty pounds, because of the large original full length of the spring.

The principal reason for having the pipe 29 long enough to reach below the surface of the liquid is to produce bubbles which will make a sound as long as gas continues to discharge from the cartridge 36 into the bottle. The flattened rubber tube 30 at the lower end of the tube 29, serves two purposes. One is that the flattened end of this tube 30 is distended by the gas pressure from the inside and this causes a more noisy bubbling of gas through the liquid, as previously explained; and another important function of the flattened tube 30 is to prevent back flow of liquid from the bottle into the tube 29 when the upper shell is removed from the charger after a charging operation.

The "normal" pressure of gas in the bottle after the piercing of the capsule 36, for purposes of the description in the specification claims, is to be considered the pressure of the gas when expanded into the space provided for gas and without any absorption of the gas by the liquid in the bottle. The gas pressure will approach this value if no gas is permitted to escape from the bottle and there is no shaking of the bottle during the time that the cartridge is discharging its gas into the gas space above the liquid.

The preferred embodiment of the invention has been illustrated and described, but changes and modifications can be made, and some features can be used in different combinations without departing from the invention as defined in the claims.

What is claimed is:

1. A beverage dispenser comprising upper and lower shells forming a container of a size to receive a commercial beverage bottle, means for bringing the shells together with a telescoping movement, said means comprising cam and cam follower means on the respective shells, a stopper for the bottle independent of the shells and having a holder thereon for receiving a cartridge of compressed gas, a needle supported by the stopper in position to pierce the cartridge when the cartridge is thrust downwardly toward the bottle, an annular face on the stopper in position to contact with the top lip of the bottle, and a spring carried by the upper shell for transmitting force to thrust the cartridge downwardly into contact with the needle, the spring being in a holder which maintains a predetermined compression on the spring at all times to reduce the variations in the force of the spring resulting from variations in the height of the different bottles which are used in the beverage charger, the stopper having a conduit through which gas discharged from the cartridge enters the interior of the bottle below the stopper.

2. A beverage charger comprising a container for holding a bottle of liquid to be charged, a stopper for the bottle having an annular face that seats against a top lip of the bottle, a cartridge holder carried by the stopper, a needle for piercing a cartridge when it is pressed downwardly in the holder, the stopper having a conduit through which compressed gas escaping from the cartridge enters the bottle, and means for holding the stopper down against the top lip of the bottle against the pressure of the gas within the bottle, said means comprising a spring compressed between the cartridge and the upper portion of the container.

3. The beverage charger described in claim 2, and in which the spring which exerts downward pressure on the cartridge applies the force for piercing the cartridge with the needle, and there is a spring holder which maintains the spring under a predetermined initial pressure to reduce the variations in spring pressure caused by variations in the height of the stopper when using bottles of different height within the charger.

4. A beverage charger comprising upper and lower parts which receive a bottle containing a liquid to be charged, means for bringing the upper and lower parts of the charger together, a stopper having a face that bears against a top lip of the bottle, a holder for receiving a compressed gas cartridge of predetermined size and capacity, the holder including a self-sealing gasket into which a nose of the cartridge fits, the cartridge holder being located to dispose the cartridge in position to be thrust downwardly by movement of the upper and lower parts of the charger toward one another, a needle located below the self-sealing gasket in position to pierce the end of the cartridge, the stopper having a conduit through which compressed gas from below the gasket flows into the bottle, and spring means for holding the stopper down against the lip of the bottle, said spring means including a holder maintaining an initial pressure on the spring to reduce the variations in spring force resulting from differences in the height of the bottles used within the beverage charger.

5. The beverage charger described in claim 4, and in which the spring means is located in position to exert a downward pressure on the cartridge and the pressure of the spring means against the stopper is transmitted through the cartridge.

6. A beverage charger comprising a container for receiving a particular size of commercial beverage bottle, having manufacturing tolerances in their heights within a certain limit, a holder associated with the container for supporting a compressed gas cartridge of predetermined size and capacity, a needle below the holder and against which the cartridge is pressed to pierce the cartridge, a stopper having an annular face that fits against the top lip of the bottle within the container, and spring means carried by the container for urging the stopper against the top lip of the bottle and against gas pressure within the bottle, and a holder for the spring maintaining a predetermined initial compression of the spring for reducing variations in the spring force caused by differences in the position of the stopper with bottles of different height.

7. The beverage charger described in claim 6, and in which the spring is in position to exert a pressure against the upper end of the cartridge and the force of the spring against the stopper is transmitted through the cartridge.

8. A beverage charger comprising a container for receiving a bottle of liquid to be charged, a holder for a compressed gas cartridge of predetermined size and capacity, a needle associated with the cartridge holder in position to pierce the cartridge when the cartridge is pressed toward the bottle, a stopper that contacts with the lip of the bottle and that is supported by said lip, the stopper having a conduit for the passage of gas from the pierced cartridge to the interior of the bottle, a spring that urges the stopper against the top lip of the bottle with a force substantially less than the force of the gas against the stopper when the stopper is in contact with the lip of the bottle and the cartridge has discharged its contents into the bottle with the liquid standing unagitated at the intended liquid level in the bottle.

9. A beverage charger comprising a container for receiving a bottle of liquid to be charged, a holder for a cartridge of compressed gas, a needle for piercing the cartridge to release the gas, a stopper at the top of the bottle having an annular face that contacts with the bottle lip to serve as a valve element for preventing or regulating flow of gas from the bottle, a second stopper that fits down in the neck of the bottle, the second stopper being hollow and having gas vent openings through its upper and lower parts, and a trap for preventing foam, that travels up along the inside surface of the bottle, from reaching the gas vent openings through the second stopper, said trap comprising a ridge extending around the passage and having a sharp lower end around which the foam cannot travel and from which liquid drips as the foam accumulates along said lower edge.

10. The beverage charger described in claim 9, and in which a tube extends downwardly through the second stopper and there is a collar secured to the tube within the hollow interior of the second stopper, the tube extending through openings in the upper and lower parts of the second stopper, which openings are smaller than the cross-section of the collar so that longitudinal movement of the tube brings the collar against the inside surface of either the upper or lower parts of the second stopper to pull it out of or into the neck of the bottle.

11. A beverage dispenser comprising upper and lower shells forming a container of a size to receive a commercial beverage bottle, cam means on one of the shells and cam follower means on the other shell for bringing the shells together with a telescoping movement, a stopper for the bottle, a needle in position to pierce a cartridge placed in the upper shell, a face on the stopper in position to contact with the top lip of the bottle, a spring in the upper shell in position to transmit force to the cartridge as the upper shell is moved toward the lower shell, and means for holding the spring under a minimum predetermined compression at all times to reduce the variations in the force of the spring resulting from variations in the height of different bottles, the stopper having a conduit through which gas discharged from the cartridge enters the interior of the bottle below the stopper.

12. A beverage charger comprising a container for holding a commercial beverage bottle, a valve element having a face that sets against the lip at the top of the bottle in the container, said face sloping inwardly and downwardly toward the longitudinal axis of the bottle, the slope of said face toward said axis being less at greater distances from the axis so that the valve element extends disproportionately further into a bottle having a larger mouth, a tube extending downwardly from the valve element and into the bottle for a substantial distance, the valve element having an opening therethrough in communication with the tube, a needle at the upper end of the tube, means for holding a cartridge of compressed gas in position to be pierced by the needle, and pressure means for holding the valve element against the lip of the bottle and for pressing the cartridge downwardly against the needle.

13. A beverage charger for use with commercial beverage bottles which are of different height and diameter within a limited range of sizes, said charger comprising a lower shell with a bottom on which the bottle rests, an upper shell that fits over the top of the bottle and that connects with the lower shell, means within the upper shell for holding the upper end of a cartridge of compressed gas and for exerting pressure on the cartridge, a stopper for the the bottle, and a needle supported by the stopper for piercing the lower end of the cartridge, the bottom of the lower shell on which the bottle rests being concave about a center located in the region of said means for exerting pressure on the cartridge.

References Cited in the file of this patent

UNITED STATES PATENTS

| | | |
|---|---|---|
| 2,336,708 | Ward | Dec. 14, 1943 |
| 2,534,483 | Thomas | Dec. 19, 1950 |

FOREIGN PATENTS

| | | |
|---|---|---|
| 81,350 | Sweden | Aug. 28, 1934 |